United States Patent [19]

Slusher

[11] 4,387,952
[45] Jun. 14, 1983

[54] SINGLE AXIS BEAM SCANNER

[75] Inventor: Robert B. Slusher, San Jose, Calif.

[73] Assignee: Spectra-Physics, Inc., San Jose, Calif.

[21] Appl. No.: 248,105

[22] Filed: Mar. 27, 1981

[51] Int. Cl.³ .................... G02B 27/17; B23K 26/00
[52] U.S. Cl. ........................... 350/6.9; 219/121 LW; 219/121 LM
[58] Field of Search ............... 350/6.9, 6.5, 486, 320; 219/121 LW, 121 LV, 121 LU, 121 LQ, 121 L, 121 LC, 121 LJ, 121 LM; 250/236

[56] References Cited

U.S. PATENT DOCUMENTS

| 2,758,502 | 8/1956 | Scott et al. | 350/6.9 |
| 3,619,028 | 11/1971 | Keene et al. | 350/6.9 |
| 4,049,945 | 9/1977 | Ehlscheid et al. | 219/121 LU |
| 4,196,461 | 4/1980 | Geary | 350/6.9 |

FOREIGN PATENT DOCUMENTS

| 971883 | 1/1951 | France | 250/236 |
| 54-121249 | 9/1979 | Japan | 219/121 LC |
| 54-116356 | 9/1979 | Japan | 219/121 LW |
| 55-69118 | 5/1980 | Japan | 350/6.9 |

Primary Examiner—Jon W. Henry
Attorney, Agent, or Firm—Donald C. Feix

[57] ABSTRACT

Two concave spherical metal mirrors are used to scan a continuous wave laser beam for heat treating of metals. The mirrors are rotated in opposite directions and each is tilted at a small angle with respect to its axis of rotation. The frequencies of rotation of the mirrors are made constant by a precision timing drive linkage which also allows for phase adjustment. The beam deflection from an individual mirror describes an ellipse, but the deflection when added to that from the second mirror with the proper phase relationship to the first is a straight line. The input laser beam, which is too large in diameter for heat treating, is made to converge by the two mirrors, oriented so as to compensate for astigmatism. Spot size and scan width are adjustable over a wide range, as is scan frequency, which is equal to mirror rotational frequency. The scan produces a uniform, time-averaged distribution of power on the work piece.

15 Claims, 7 Drawing Figures

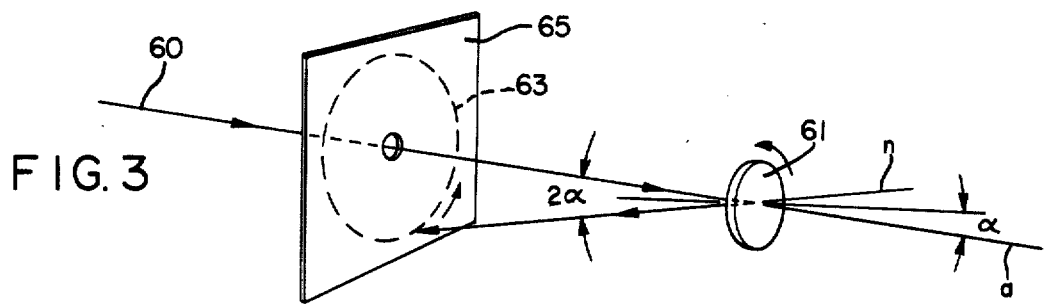
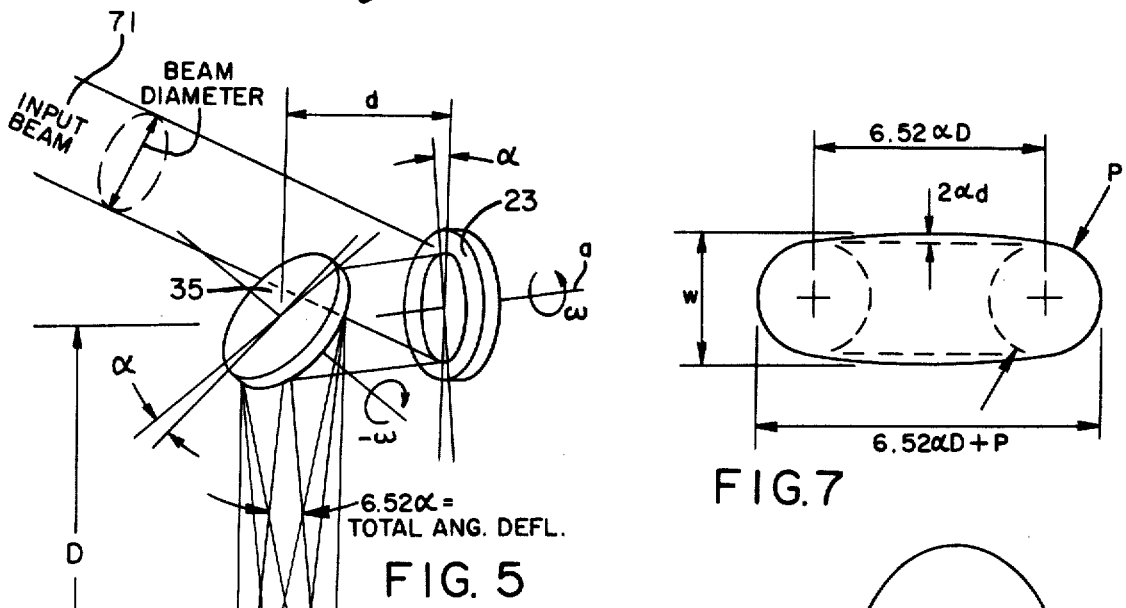
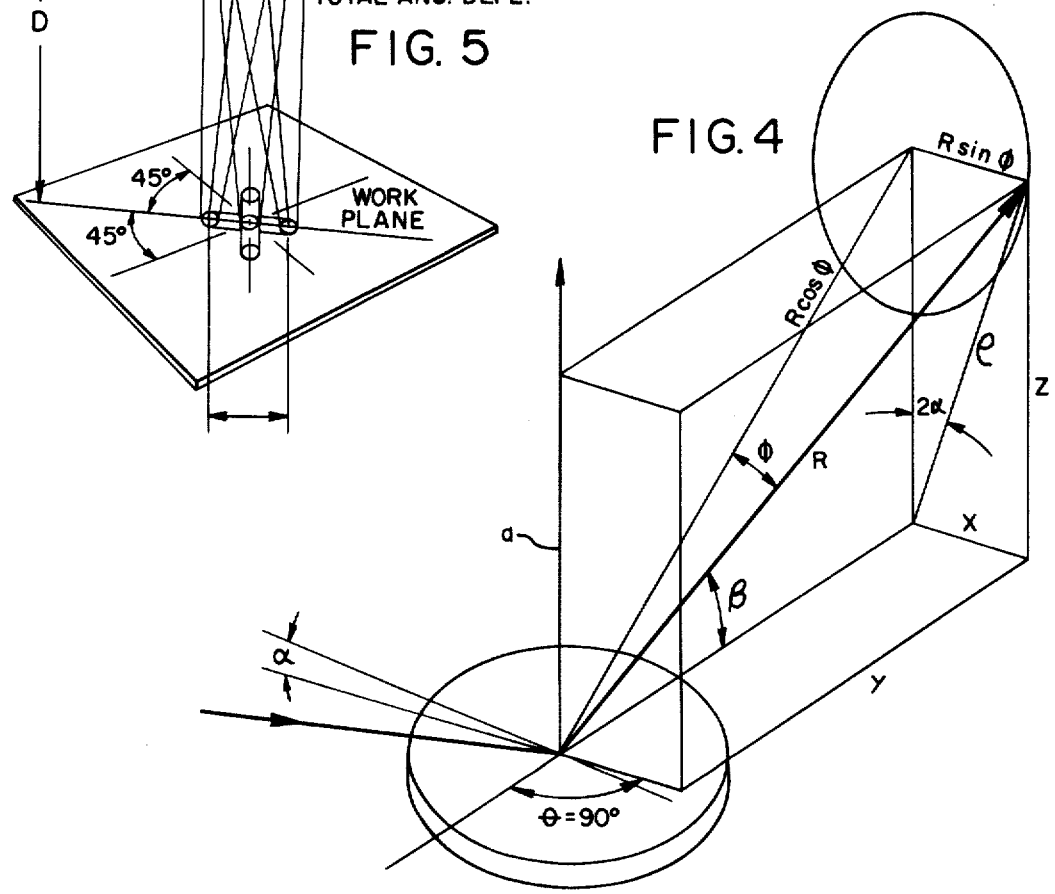

SINGLE AXIS BEAM SCANNER

BACKGROUND OF THE INVENTION

The invention relates to scanning of laser beams onto work surfaces. More particularly, it relates to improved scanning of a reshaped, concentrated laser beam onto a workpiece utilizing rotating spherical mirrors to achieve surface heat treating. The invention encompasses both a method and an apparatus for such scanning.

Laser heat treating of metals has become an accepted and proven industrial process and has expanded into many industries. The use of lasers for heat treating has provided unique solutions to many difficult problems and has replaced such hardening methods as chrome plating in many instances. Its main utility is the ability selectively to harden specific areas of a part without affecting the surrounding area, which often is not desired to be hardened. This can be accomplished because of the unique capability of a laser to concentrate an extremely high energy in a well-defined area. The beam striking the surface to be heat treated can be shaped to give the proper heat treated profile and also to maximize coverage rates.

In laser heat treating, the ability to change the size and shape of the beam is very important. There have been basically four separate techniques for shaping the beam:

1. Reimaging the beam using spherical optics enables changing the absolute size of the beam but not its general shape or power distribution.
2. Reimaging the beam using cylindrical optics enables changing absolute size and shape of the beam but not its general power distribution.
3. Integration of the beam using a segmented aperture mirror and spherical optics results in a change of the absolute size and shape of the beam and an averaging of spatial variations in power density.
4. Scanning the beam with a single vibrating concave mirror enables changing the shape and the absolute size of the beam and also smoothes spatial variations in power density.

Techniques 1 and 2 are limited to specific applications where the resultant uneven power distribution is acceptable. Technique 1 is by far the simplest and least expensive way to shape the beam but has the greatest limitations.

Technique 3 utilizes flat mirror segments of a fixed aspect ratio, mounted in a concave backup structure and can achieve uniform power density. However, it has the disadvantages that the ratio is not adjustable and the mirror is extremely expensive and usually requires other optics to reimage the spot to the proper absolute size.

Technique 4, which employs vibration to accomplish scanning, provides more flexibility for adjusting size and shape of the beam on the work piece. The spot size of the beam at the work piece is adjusted by changing the distance from the scanner to the work and the scan width adjustment is made at the scanner itself. Scanning can be used to create a uniform, time-averaged distribution of power, preventing melting or soft spots in the hardened surface.

Scanning using a vibrating mirror has been used with high power lasers, but the method has several problems. The principal problems have been a lack of pointing stability, variations in scan amplitude and coupling of vibrations into the scanner's mechanical support, causing further problems of pointing stability and drift and tending to weaken the integrity of the system.

It is an object of this invention to improve laser scanning, particularly for heat treating, through a system which eliminates the problems of vibrating mirror scanners while also giving greater control and flexibility for adjustment of the beam.

SUMMARY OF THE PRESENT INVENTION

The laser beam scanning apparatus and method of the present invention scan a beam so as to produce a substantially even power distribution over a rectangular area by averaging out hot spots in any irregular power distribution of the laser beam itself.

Like the prior art method of scanning using a vibrating concave mirror, the method of the invention produces a change in the shape and the absolute size of the laser beam. However, the invention avoids vibrations and their attendant disadvantages, accomplishing the beam scan by using a pair of counter rotating tilted mirrors.

When a laser beam is incident on a tilted rotating mirror along the mirror's axis of rotation, the reflected beam will form a circular pattern on a flat target whose surface is normal to the incident beam. If the incident beam is at an angle to the axis of rotation of the mirror, an elliptical reflected pattern will result on a flat target normal to the reflected beam. The greater the angle between the incident beam and the axis of rotation of the mirror, the shorter will be the minor axis of the resulting ellipse, and thus the more extreme will be the ellipse.

If the beam reflected off one rotating mirror is directed onto another, similarly tilted mirror rotating at the same speed in the opposite direction, the phase of the two mirrors can be adjusted to produce a straight line beam scan on a target normal to the final reflected beam. The beam scanning system of the present invention utilizes this principle for a controlled, uniformly distributed scanned beam useful for heat treating of metal surfaces.

Control and adjustability of the beam result from use of the preferred apparatus for beam scanning under the principles of the invention. Concave mirrors preferably are employed, of equal curvature, to allow focussing of the scanned beam and therefore a means to change the spot size of the beam on the work surface. This can be accomplished by changing the distance from the second mirror to the work surface. The standoff from the workpiece can also be adjusted by putting different radius mirrors in the system.

Astigmation is introduced by the first mirror, since a beam is being reflected angularly off a concave mirror. However, this is very nearly compensated for by the use of a similarly concave second mirror, with the preferred relative orientation described below.

The mirrors most advantageously comprise first surface metal mirrors, which are less expensive than transmitting optics such as prisms. Also, the first surface mirrors may be cooled by air cooling, as opposed to water cooling which would be required with transmitting optics, a difficult proposition when rotation is involved.

In one embodiment of the method of the invention, a laser beam is scanned onto a work piece by first directing an input laser beam at a first mirror at an average angle β to its surface. The first mirror is rotated about an axis passing centrally through the mirror's surface, with the mirror tilted from the axis such that a perpendicular to the surface is at an angle α from the axis of rotation.

A second mirror is positioned in the path of the reflected beam from the first mirror, such that the beam from the first mirror strikes the second mirror at the same average angle β to its surface. This occurs while the second mirror is rotated at the same angular speed as the first about an axis passing centrally through the second mirror's surface. Similarly to the first mirror, the second mirror is tilted at an angle α from the axis of rotation.

The positions of the mirrors are selected, and the phase of their rotation is adjusted, such that the resulting beam scan reciprocates substantially in a straight line.

To produce the straight line beam scan, the two mirrors are rotated in opposite directions, with 45° angles of incidence and reflection on each mirror and with the input beam and the centers of the two mirrors in a common plane approximately parallel to the work surface. The resulting straight line beam scan is oriented at 45° to the vertical plane containing the centers of the two mirrors, in either of two orientations 90° apart.

It is therefore among the objects of the invention to orient a pair of rotating, tilted mirrors to one another and to an input laser beam in such a way as to produce a straight line of beam scan on a work piece surface, a practical scan shape that can be used to uniformly distribute power over a selected area of the work piece for surface heat treating.

Counter rotating mirror apparatus and methods which incorporate the structures and techniques described above and which are effective to function as described above constitute further, specific objects of the invention.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWINGS

FIG. 3 is a schematic view in perspective to demonstrate the effect of a rotating, tilted mirror when an input beam is incident along the mirror's axis of rotation.

FIG. 4 is another schematic view in perspective, to demonstrate the effect of a rotating, tilted mirror when the input beam strikes the mirror obliquely, at an average angle β to the surface of the rotating mirror.

FIG. 5 is a schematic view in perspective showing the preferred orientation of the input laser beam and the two mirrors and their relationship to the work piece, for the apparatus of FIGS. 1 and 2 and according to the method of the invention.

FIG. 7 is a plan view indicating the shape of the resulting scanned beam as it strikes the work piece.

DETAILED DESCRIPTION OF A PREFERRED EMBODIMENT

Figure 1:
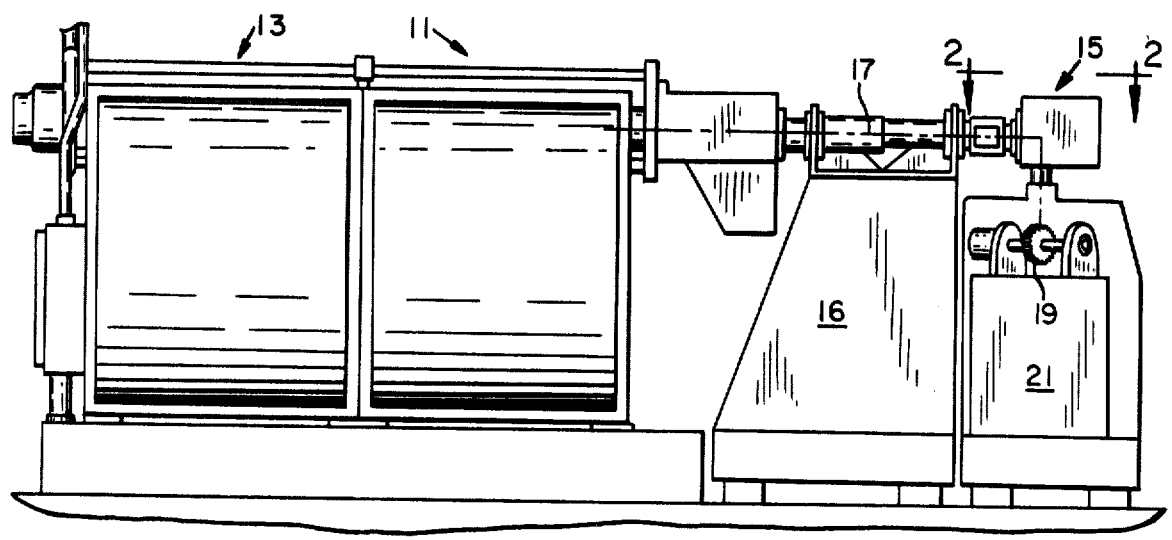
FIG. 1 is a side elevation view of a counter rotating mirror laser beam scanning apparatus according to one embodiment of the present invention.

A laser beam scanning system constructed in accordance with one embodiment of the present invention is indicated generally by the reference numeral 11 in FIG. 1.

The system 11 includes a beam generator 13, only generally indicated in the drawing, and a beam scanning apparatus 15 supported on a scanner support frame 16 and positioned to receive a laser beam from the generator 13 along an indicated center line 17. The scanner 15 scans the beam onto a work piece 19 which is held by a separate work handling machine 21 not forming a part of the invention. The machine 21 appropriately rotates or otherwise moves the work piece 19 for desired treatment under the scan. One application of the system 11 of the invention is to heat treat the surface of a work piece such as that shown at 19.

The beam generator 13, also not part of the present invention, may be one which produces a 5 kilowatt continuous wave $CO_2$ laser, suitable for heat treating of metals. Laser beams of other characteristics are also suitable for use with the scanning apparatus 15 and the method of the invention.

Figure 2:
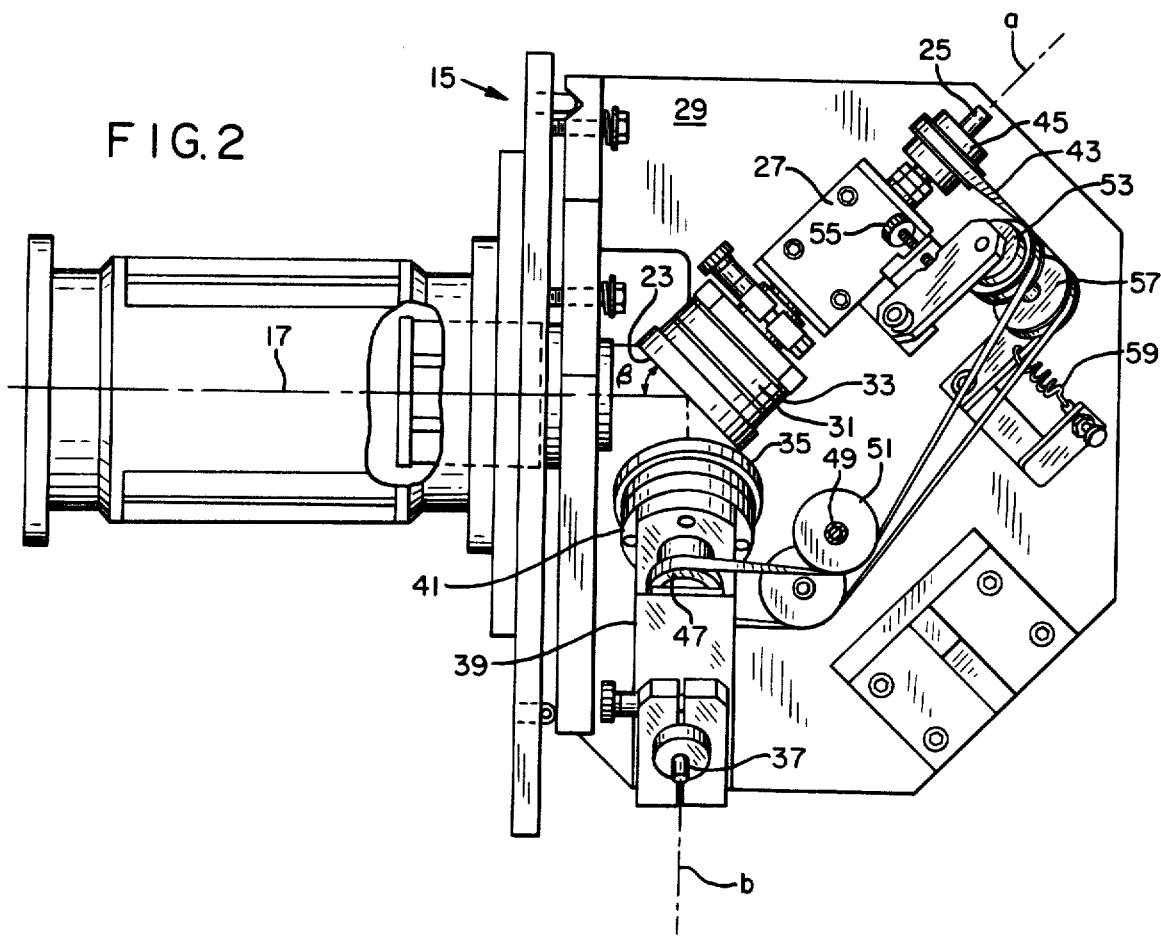
FIG. 2 is an enlarged plan view of the operative scanning portion of the apparatus, as viewed along the line and in the direction indicated by the arrows 2—2 in FIG. 1.

FIG. 2 shows the scanning apparatus 15 in plan view. A laser beam from the generator 13 travels along the center line 17 and strikes a first mirror 23. The laser center line 17 is shown in the drawings as being horizontal, at least as related to a horizontally oriented work piece surface. However, it should be understood that when the terms "horizontal" and "vertical" are used herein, they refer only to relative directions and orientations and are convenient terms to describe the system as shown and oriented in the drawings. The entire apparatus 11 could be in other orientations, but with the same relationship to the work piece 19.

The first mirror 23 is rotated about an axis a, mounted on a shaft 25 which rotates in a bearing block 27, secured to a frame 29 of the scanning apparatus 15. As shown in FIG. 5, the mirror is tilted such that a perpendicular to its surface is at a small angle α (not illustrated in FIGS. 1 and 2) to the axis of rotation a. Adjustment of the mirrors tilt is effected through rotation of adjustment screws 31 on a mirror mount 33 which forms part of the rotating assembly.

The beam reflected from the first mirror 23 is incident centrally on the surface of a second mirror 35 which rotates about an axis b, its shaft 37 being mounted in a bearing block 39. The second mirror is also tilted at the same angle α, adjustable at a mirror mount 41. This mirror's surface and its rotational axis b are angled downwardly in this embodiment so that the final reflected beam will be directed substantially vertically downwardly toward the work piece 19.

In the embodiment illustrated, the two mirrors 23 and 35 and the centerline 17 of the input laser beam lie in a common plane which is horizontal, or parallel to the work piece surface being treated and perpendicular to the final reflected beam from the scanning apparatus 15. This is a simple arrangement wherein the average angles $\beta$ of incidence and reflection from each mirror are 45°. However, the objects of the invention could be achieved with other relative positionings of the two mirrors. What is important is that the incident angles $\beta$ be the same for both mirrors, that the tilt angles $\alpha$ be the same for both mirrors, that the mirrors rotate in opposite directions and that the phase of the mirrors be properly adjusted, as explained below.

Both mirrors 23 and 35 preferably are concave mirrors for focussing the beam, and of the same curvature.

As illustrated in FIG. 2, the two mirrors 23 and 35 are rotationally linked together by a timing belt 43 or similar endless, timed drive. The belt 43 engages timing pulleys 45 and 47 on the shafts 25 and 37 associated with the respective mirrors, and a shaft 49 drives the belt via a drive pulley 51. The pulleys 45 and 47 are the same size, so that the mirrors are driven at the same speed. As is apparent from FIG. 2, the belt 43 is arranged to rotate the two mirrors in opposite directions.

Fine timing or phase adjustment between the two rotating mirrors is achieved through as phase adjust pulley 53. As indicated, this pulley is so mounted as to be adjustable in position, farther away from or closer to the pulley 45 driving the mirror 23. Adjustment is effected using a screw type adjustor 55 in the embodiment shown. Moving the phase adjust pulley 53 farther away from the pulley 45 puts more length of belt between the mirror pulleys 45 and 47 on one side, while shortening the belt on the other side, causing a tension pulley 57 to be pulled toward the pulley 45 against a tension spring 59.

This of course effects a phase adjustment between the two mirrors, a change in the relative rotational positions of the two mirrors at any given time. Phasing must be precise to achieve a straight line beam scan. Correct phasing can be approximated by the relative positioning of the mirror timing pulleys 45 and 47 at the time the timing belt 43 is assembled on the pulleys. It can then be fine tuned, even while the scanner operates, by adjustment of the phase adjustment screw 55.

As shown in FIG. 3, when a laser beam 60 is incident on a tilted rotating mirror 61 along the mirror's axis of rotation a, the reflected beam will form a circular pattern 63 on a flat target 65 whose surface is normal to the incident beam, or normal to the average orientation of the reflected beam. The angular deflection is $2\alpha$ where $\alpha$ is the angle the normal to the mirror surface n makes with the axis of rotation a.

If the beam is not parallel with the axis of rotation, the beam will be deflected in an elliptical pattern on a flat target whose surface is normal to the center of rotation of the reflected beam. With the target so oriented, foreshortening of the pattern due to the tilt of the target is not a factor. As shown in FIG. 4 the incident beam makes an angle $\beta$ with the surface of the mirror where $\beta >> \alpha$. The angular deflection along the major axis of the ellipse is the same as for the case when $\beta$ is 90°, namely $4\alpha$. However, the angular deflection along the minor axis is lessened, and the minor axis is the projected pattern shortened as $\beta$ is reduced from 90°. To find the angular deflection along the minor axis, simple trigonometry is used as follows:

$$R = \sqrt{x^2 + y^2 + z^2}$$

where $X = R \sin \phi$ $\rho = R \sin \beta$ $Z = \rho \cos 2\alpha = R \sin \beta \cos 2\alpha$ $Y = R \cos \beta$ Substitution gives:

$$1 = \sin^2 \phi + \cos^2 \beta + \sin^2 \beta \cos^2 2\alpha$$

Factoring out $\sin \phi$ and simplifying leaves $$\sin \phi = \sin \beta \sqrt{1 - \cos^2 2\alpha} = \sin \beta \sin 2\alpha$$

For small $\alpha$, $\sin 2\alpha = 2\alpha$; therefore, $$\sin \phi = 2\alpha \sin \beta$$

where $\beta >> \alpha \phi$ will be small so that the relation reduces to $$\phi = 2\alpha \sin \beta$$

The total deflection angle along the minor axis is given as

Tot. Ang. Defl. (minor axis) $= 2\phi = 4\alpha \sin \beta$

Scanning the beam in an elliptical pattern is not useful for heat treating, so that a second mirror is necessary to give a deflection along a straight line. As is shown in FIG. 5 two mirrors are oriented such that $\beta$ is equal for both, in this case 45°, with the beam and the two mirrors in a common horizontal plane. The mirrors are separated by a distance d and the distance from the second mirror to the work plane is D. Both mirrors are tilted by the angle $\alpha$ with respect to their axis of rotation and are counter rotated at an angular velocity $\omega$.

Figure 6:
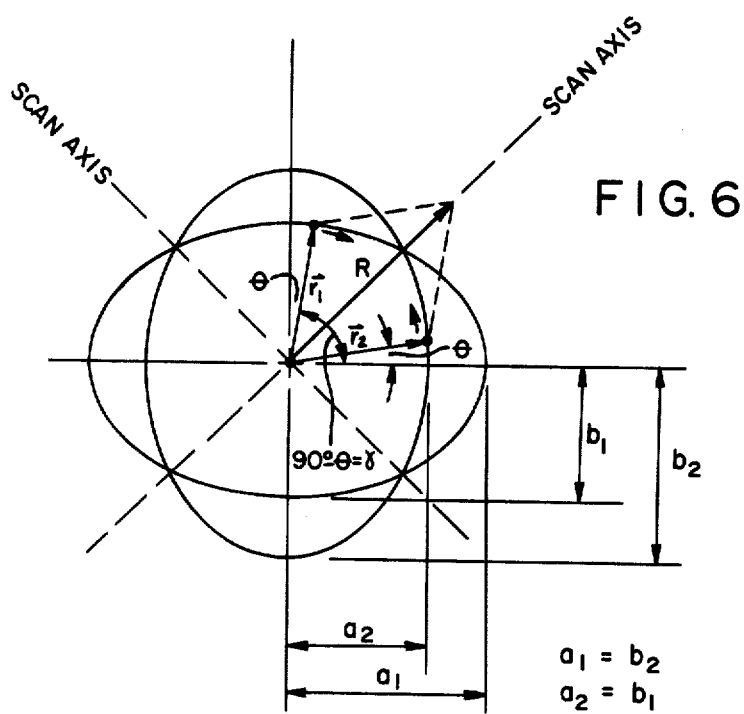
FIG. 6 is a plan view indicating two superimposed ellipses, each of which represents the beam pattern that would be formed from a respective one of the two mirrors if it rotated while the other remained stationary.

When viewed at the work plane the deflection from each mirror, when the other is held stationary and not tilted relative to its axis of rotation, forms an ellipse and these two ellipses are oriented at 90° to one another for the preferred mirror configuration of FIG. 5, as shown in FIG. 6.

The ellipses are at 90° to one another because of the 45°$\beta$, horizontal planar configuration of this preferred embodiment. The first mirror 23 produces an ellipse whose major axis is parallel to the input laser beam 71, while the second mirror produces an ellipse with major axis at 90° to the input laser. This is apparent from FIG. 5 and from the above discussion relating to major and minor axes.

If the plane of the input beam 71 and the two mirrors is other than horizontal (i.e., parallel to the plane of the work piece), the two ellipses that would be formed by either mirror alone will not be at 90° to one another as in FIG. 6. The $\beta$ angle of the two mirrors will vary from configuration to configuration, but the two mirrors will have equal $\beta$ angles in each case. In an extreme situation, the input beam and the two mirrors can be in a vertical plane, with the input beam and the final reflected (scanning) beam both aimed vertically downwardly. $\beta$ could again be 45° or theoretically any other angle between zero and 180°. In this extreme situation, the two ellipses will be superimposed, with major axes parallel and overlying one another.

This and all other situations where the $\beta$ angles are equal, the $\alpha$ angles are equal, and the mirrors are counter-rotated at equal speeds, are still within the purview of the present invention. As long as two similar, equally-sized ellipses would be formed by the two mirrors if each acted alone, the two elliptical patterns can be caused to form a straight-line reciprocating resultant along the bisector of the two major axes, by proper phasing of the two mirrors' rotations.

The size of the ellipses is of course controlled by the $\alpha$ angle. Increases in $\alpha$ increase the size of an ellipse, though the shape remains the same. It can be seen from inspection of FIG. 5 that for equal $\alpha$ the first mirror 23 could be expected to make a slightly larger ellipse (if acting alone with the second mirror 35 stationary) than the second mirror (if acting alone), since the total distance from the first mirror to the work surface (D+d) is greater than the distance D from the second mirror to the work surface. However, the distance d between mirrors is sufficiently small with respect to the much larger distance D that the difference in ellipse size is negligible. Alternatively, the $\alpha$ angle for the second mirror 35 could be made slightly larger than that for the first mirror 23 to compensate for this effect.

Referring again to FIG. 6, as can be seen for equal $\alpha$ the semi-major and semi-minor axes of one ellipse are equal to the semi-minor and semi-major axes of the other ellipse respectively. The magnitudes of the deflection vectors $r_1$ and $r_2$ can be found using the general relation $$r^2 = \frac{a^2 b^2}{a^2 \sin^2 \theta + b^2 \cos^2 \theta}$$

which is true for any ellipse. From the previous analysis it can be shown that $$a_1 = b_2 = 2\alpha D \quad \text{and} \quad a_2 = b_1 = 2\alpha D \sin \beta$$

Substitution of these into the general relation gives $$|r_1| = \frac{2\alpha D}{\sqrt{\frac{\sin^2 \gamma}{\sin^2 \beta} + \cos^2 \gamma}} \quad \text{and} \quad |r_2| = \frac{2\alpha D}{\sqrt{\sin^2 \theta + \frac{\cos^2 \theta}{\sin^2 \beta}}}$$

To have a linear scan the resultant deflection must go through the origin of the X-Y plane. This will occur only when the magnitudes of $r_1$ and $r_2$ are equal and when they are 180° out of phase. From FIG. 7 it can be seen that this condition can only occur at two places, namely at $\theta = 45°$ and 135° with $\gamma = 225°$ and 315° respectively. Either one of these sets of initial phase conditions must be met in order to scan a straight line when counter rotating the mirrors at an equal angular velocity. The first set of angles, namely 45° and 225°, will cause a scan between the I and III quadrants whereas 135° and 315° will scan between the II and IV quadrants. In other words, for a straight line, the paths of the two theoretical counter rotating beams in their separate elliptical patterns must cross at either the 45° and 225° locations or at the 135° and 315° locations.

Since the deflection vectors are counter rotating, the phase angle between them is constantly changing but can be found by the two relations $$\gamma = 90° - \theta \quad \text{and} \quad \gamma = 270° - \theta$$

for the two initial conditions of $\theta = 45°$ and 135° respectively. The preceding shows that changing the initial phasing by 180° will rotate the resultant scanned line by 90°. This can be useful if the desired aspect ratio of the scanned beam is less than unity.

The total linear deflection of the scanned beam for $\beta = 45°$ is given as twice the sum of $|r_1|$ and $|r_2|$ at either set of initial phase angles.

Letting $\theta = 45°$, then $\gamma = 45°$ and we have $$\text{Total linear deflection} = 2(2 \alpha D) \left( \frac{1}{\sqrt{\frac{.5}{.5} + .5}} + \frac{1}{\sqrt{.5 + \frac{.5}{.5}}} \right)$$

$$= 4 \times D (1.63)$$

Therefore, total linear deflection $= 6.52\alpha D$

The shape of the scanned beam as it strikes the work piece is shown in FIG. 7. Here P is the beam diameter at the workpiece. The slight broadening in the center of the beam is due to the fact that the two mirrors are separated by a distance d and the center of the beam is scanned in an elliptical pattern on the second mirror. The major axis of this ellipse has a length of 4$\alpha$d. This deflection cannot be compensated for by the second mirror and results in the slight broadening as shown in FIG. 7. Normally $\alpha$ and d can be made small enough so that this problem can be ignored.

To achieve the desired spot diameter P the beam is made to converge by making the two mirrors concave with equal curvature. If only one mirror was concave the resultant astigmatism would cause too much distortion of the beam. Making each one concave and orienting them as shown in FIG. 5 results in a compensation for all but a small amount of astigmatism, and this is a principal reason why that configuration is preferred. In the scanner used in this embodiment the mirrors preferably have a radius of curvature of 2.3 meters, and for one mirror the separation of sagittal and tangential focal planes is 80 cm for 45° incidence. When two mirrors are used the separation is recued to 1.5 cm which has no effect on the heat treating process.

While I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. A method of scanning a high power laser beam onto a metal workpiece surface to distribute power substantially uniformly over a selected area of the workpiece surface for metallurgically heat treating the selected area of the surface, said method comprising:

directing an input high power laser beam at a first mirror at an average angle beta to its surface, the first mirror rotating about an axis passing centrally through the mirror's surface, the mirror being tilted such that a perpendicular to the surface is at an angle alpha from the axis of rotation;

positioning a second mirror in the path of the reflected beam from the first mirror, such that the beam from the first mirror strikes the second mirror at the same average angle beta to its surface, while rotating the second mirror in the opposite direction and at the same angular speed as the first about an axis passing centrally through the second mirror's surface, the second mirror being tilted such that a perpendicular to its surface is at approximately the same angle alpha from its axis of rotation;

selecting the mirror positions and adjusting the phase of the two rotating mirrors such that the resulting beam scan reciprocates substantially in a straight line on the metal workpiece surface, and effecting a metallurgical change in the selected area of the workpiece surface scanned by the beam through the heating produced by the high power scanned beam.

2. The method of claim 1 wherein beta is about 45°.

3. The method of claim 1 wherein the mirrors and the input laser beam are so positioned that the angles of incidence and reflection at each mirror are about 45°, with the input beam and the centers of the two mirrors in a common plane approximately parallel to the work surface, producing a straight line beam scan oriented at 45° to a plane normal to the work surface and containing the mirror centers.

4. The method of claim 1 further including concentrating the laser beam through the use of concave first and second mirrors.

5. The method of claim 1 wherein the reciprocating beam from the mirrors is scanned onto a metal surface for heat treating selected areas of the surface.

6. The method of claim 1 wherein the mirrors and the input laser beam are so positioned that each mirror, if acting alone with the other mirror stationary, would form an elliptical beam pattern the major axis of which is substantially perpendicular to that of the other mirror.

7. A method of scanning a high power laser beam onto a metal workpiece surface to distribute power substantially uniformly over a selected area of the workpiece surface for metallurgically heat treating the selected area of the surface, said method comprising:

reflecting an input high power laser beam off a first mirror and from there off a second mirror, at substantially the same average angle of incidence at both mirrors;

rotating both mirrors, simultaneously at the same speed in opposite directions, each about an axis that is tilted a small angle from a perpendicular to the mirror's reflecting surface, thereby forming on a work surface generally perpendicular to the final reflected beam a pattern represented by the resultant of two theoretical ellipses, each of which would be formed by one of the mirrors acting alone with the other stationary, the two ellipses being substantially similar and when superimposed, forming a pattern generally symmetrical about a bisector between the major axes of the two ellipses;

adjusting the phase relationship of the two rotating mirrors such that the resulting beam scan reciprocates in substantially a straight line along the bisector of the major axes of the ellipses on the metal workpiece surface, and effecting a metallurgical change in the selected area of the workpiece surface scanned by the beam through the heating produced by the high power scanned beam.

8. A method of scanning a laser beam onto a workpiece, comprising:

reflecting an input laser beam off a first mirror and from there off a second mirror, at substantially the same average angle of incidence at both mirrors;

rotating both mirrors, simultaneously at the same speed in opposite directions, each about an axis that is tilted a small angle from a perpendicular to the mirror's reflecting surface, thereby forming on a work surface generally perpendicular to the final reflected beam a pattern represented by the resultant of two theoretical ellipses, each of which would be formed by one of the mirrors acting alone with the other stationary, the two ellipses being substantially similar and when superimposed, forming a pattern generally symmetrical about a bisector between the major axes of the two ellipses; and adjusting the phase relationship of the two rotating mirrors such that the resulting beam scan reciprocates in substantially a straight line along the bisector of the major axes of the ellipses, and wherein the average angle of incidence is about 45° and wherein the input beam and the centers of the two mirrors are in a plane parallel to the work surface, whereby the major axes of the two ellipses are at 90° to one another.

9. An apparatus for scanning a high power laser beam onto a workpiece surface to distribute power substantially uniformly over a selected area of the workpiece surface for metallurgically heat treating the selected area of the surface, said apparatus comprising:

beam generating means for generating an input high power laser beam;

a laser scanner frame;

a first mirror mounted on a first shaft journalled for rotation on the frame, the mirror having a reflecting surface which is tilted at a small angle from perpendicularity to the shaft;

a second mirror mounted on a second shaft journalled for rotation on the frame, the second mirror having a reflecting surface which is tilted at a small angle from perpendicularity to the second shaft, said small angles being approximately equal;

the first mirror being positioned in the path of the input laser beam and the second mirror being positioned in the path of the beam reflected from the first mirror, the two mirrors being so positioned that the laser beam makes approximately the same angle of incidence on each mirror;

workpiece retaining means for holding a workpiece with a work surface approximately perpendicular to the reflected beam from the second mirror;

rotating means attached to the frame for rotating the two mirrors at the same rotational speed and in opposite directions; and phase adjusting means attached to the frame for adjusting the relative phasing of the two mirrors, to produce a substantially straight line reciprocating resultant scan on the work surface.

10. The invention defined in claim 9 wherein the mirrors are first surface mirrors.

11. The invention defined in claim 9 wherein the mirrors are concave and of substantially equal curvature.

12. The invention defined in claim 9 further including means for adjusting the tilt angle of each of the mirrors.

13. An apparatus for scanning a laser beam onto a workpiece, comprising:
- beam generating means for generating an input laser beam;
- a laser scanner frame;
- a first mirror mounted on a first shaft journalled for rotation on the frame, the mirror having a reflecting surface which is tilted at a small angle from perpendicularity to the shaft;
- a second mirror mounted on a second shaft journalled for rotation on the frame, the second mirror having a reflecting surface which is tilted at a small angle from perpendicularity to the second shaft, said small angles being approximately equal;
- the first mirror being positioned in the path of the input laser beam and the second mirror being positioned in the path of the beam reflected from the first mirror, the two mirrors being so positioned that the laser beam makes approximately the same angle of incidence on each mirror;
- workpiece retaining means for holding a workpiece with a work surface approximately perpendicular to the reflected beam from the second mirror;
- means attached to the frame for rotating the two mirrors at the same rotational speed and in opposite directions; and
- means attached to the frame for adjusting the relative phasing of the two mirrors, to produce a substantially straight line reciprocating resultant scan on the work surface, and
- wherein the centers of the two mirrors and the input laser beam are in a common plane generally parallel to the work surface, with the angles of incidence at the mirrors being approximately 45°.

14. An apparatus for scanning a laser beam onto a workpiece, comprising:
- beam generating means for generating an input laser beam;
- a laser scanner frame;
- a first mirror mounted on a first shaft journalled for rotation on the frame, the mirror having a reflecting surface which is tilted at a small angle from perpendicularity to the shaft;
- a second mirror mounted on a second shaft journalled for rotation on the frame, the second mirror having a reflecting surface which is tilted at a small angle from perpendicularity to the second shaft, said small angles being approximately equal;
- the first mirror being positioned in the path of the input laser beam and the second mirror being positioned in the path of the beam reflected from the first mirror, the two mirrors being so positioned that the laser beam makes approximately the same angle of incidence on each mirror;
- workpiece retaining means for holding a workpiece with a work surface approximately perpendicular to the reflected beam from the second mirror;
- means attached to the frame for rotating the two mirrors at the same rotational speed and in opposite directions; and
- wherein the means for rotating the two mirrors comprises a timing belt engaged with a series of timing pulleys, two of which are in driving engagement with the two respeceive shafts, and a motor driving another timing pulley in the series, the timing belt being positioned on the pulleys so as to rotate the surfaces of the mirrors in opposite rotational directions.

15. The invention defined in claim 14 wherein the phase adjusting means comprise a phase adjustment pulley engaged with the timing belt and mounting means secured to the frame and the phase adjustment pulley for permitting adjustable movement of the phase adjustment pulley, which is so positioned as to have the effect when adjusted of lengthening or shortening the belt on one side of the endless loop of belt between the shafts while shortening or lengthening, respectively, the other side of the belt, thereby effecting a shift in the relative phasing of the two mirrors; and including a spring-based idler pulley connected to the frame and engaged in said other side of the belt for maintaining tension and accommodating the shortening or lengthening.

* * * * *